US011697440B2

(12) United States Patent
Kucera (10) Patent No.: US 11,697,440 B2
(45) Date of Patent: Jul. 11, 2023

(54) DUAL TOW RING TONGUE COUPLER

(71) Applicant: Kevin Kucera, Bothel, WA (US)

(72) Inventor: Kevin Kucera, Bothel, WA (US)

( * ) Notice: Subject to any disclaimer, the term of this patent is extended or adjusted under 35 U.S.C. 154(b) by 201 days.

(21) Appl. No.: 17/378,409

(22) Filed: Jul. 16, 2021

(65) Prior Publication Data
US 2022/0017125 A1     Jan. 20, 2022

Related U.S. Application Data (60) Provisional application No. 63/052,928, filed on Jul. 16, 2020.

(51) Int. Cl.
| | |
|---|---|
| *B61G 5/00* | (2006.01) |
| *B60D 1/66* | (2006.01) |
| *B60D 1/04* | (2006.01) |
| *B60D 1/07* | (2006.01) |
| *B60D 1/46* | (2006.01) |

(Continued)

(52) U.S. Cl.
CPC ............... *B61G 5/00* (2013.01); *B60D 1/04* (2013.01); *B60D 1/07* (2013.01); *B60D 1/465* (2013.01); *B60D 1/52* (2013.01); *B60D 1/66* (2013.01); *B60T 3/00* (2013.01)

(58) Field of Classification Search
CPC . B60D 1/465; B60D 1/07; B60D 1/04; B61G 5/00
See application file for complete search history.

(56) References Cited

U.S. PATENT DOCUMENTS

| | | | |
|---|---|---|---|
| 2,872,213 | A | 10/1958 | Hosford |
| 3,664,686 | A | 5/1972 | Anderson |

(Continued)

FOREIGN PATENT DOCUMENTS

| | | | | |
|---|---|---|---|---|
| EP | 2939856 A2 | * | 11/2015 | ............ B60D 1/04 |
| FR | 2740079 A1 | * | 4/1997 | ............ B60D 1/07 |

OTHER PUBLICATIONS

TrailerParts.com = Pintle Eye Assembly with 6 Hole Channel (Download Date—Sep. 27, 2021) trailerparts.com/products/lunette-eye/pintle-eye-assemby-with-6-hole-channel.htm—Date first unavailable unknown.

*Primary Examiner* — Kevin Hurley
*Assistant Examiner* — Hosam Shabara
(74) *Attorney, Agent, or Firm* — Dean A Craine, P.S.

(57) ABSTRACT

An improved coupler for a tongue on a towed vehicle that attaches to a tow hook mounted on a towing vehicle to either pull the towed vehicle over a road or to pull the towed vehicle located on an elevated surface. The coupler includes an elongated tongue tube attached to the end of the tongue attached to the towed vehicle. Upper and lower rings are axially aligned and mounted or attached to the front surface of the tongue tube. The rings are spaced apart on the tongue tube to allow the towing vehicle to pull or push the towed vehicle over the same roadway or an elevated surface. Brackets are used between the tongue tube and the trailer tongue to prevent compression, collapse, and fore to aft or aft to fore movements. An adjustable jack is attached to the side of the tongue tube. An optional lid is provided over the top opening of the tongue tube that covers a storage compartment inside the tongue tube. An optional chock holder plate and a pair of compatible chocks may be placed inside the storage compartment.

14 Claims, 13 Drawing Sheets

(51) Int. Cl.
*B60D 1/52* (2006.01)
*B60T 3/00* (2006.01)

(56) References Cited

U.S. PATENT DOCUMENTS

| | | | |
|---|---|---|---|
| 6,974,148 B2 | 12/2005 | Moss et al. | |
| 8,356,831 B2* | 1/2013 | Pollock | B60D 1/02 |
| | | | 280/479.3 |
| 9,415,647 B2* | 8/2016 | Woolf | B60D 1/46 |
| D840,282 S | 2/2019 | Coste | |
| 10,336,145 B1* | 7/2019 | Dunn | B60D 1/363 |
| D932,951 S * | 10/2021 | Kucera | D12/162 |
| 2006/0087101 A1* | 4/2006 | Yon | B60D 1/58 |
| | | | 280/504 |
| 2014/0367625 A1* | 12/2014 | Arakelian | B60D 1/665 |
| | | | 254/418 |

* cited by examiner

DUAL TOW RING TONGUE COUPLER

This utility patent application is based on and claims the filing date benefit of U.S. provisional patent application (Application No. 63/052,928), filed on Jul. 16, 2020.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to trailer hitch couplers that attaches to a hook mounted on a towing vehicle that attaches to a hook on a towed vehicle, and more specifically, to such couplers that allow the driver to easily connect to different hooks mounted on the coupler so that the towed vehicle to be towed at different heights relative to the towing vehicle.

2. Description of the Related Art

Cranes and large construction equipment are commonly hauled on flatbed railcars that can travel over railroad tracks to different locations. The flatbed railcars may be 'hi-rail trailers that include sets of steel wheels that enable the railcar to roll over railroad tracks and sets of tires that enable the trailer to be transported over a roadway.

Sometimes, the crane and construction equipment are unloaded from the hi-rail trailer. Sometimes, the crane and construction equipment is operated on the bed of the hi-rail. As a result, forces are exerted on the hi-rail trailer, which can damage the tongue.

What is needed is a tongue coupler that permanently or selectively mounts on the distal end of a tongue attached to a towed vehicle, such as a hi-railer, that protects the tongue against movements or impacts to the trailer.

What is also needed is a tongue coupler configured to attach to a fixed hook on the towing vehicle.

What is also needed is such a tongue coupler that axially aligns the tongue on the towed vehicle with the towing vehicle when driving a roadway.

What is also needed is such a tongue coupler that allows the user to attach the hook to a lower position on the tongue coupler when the towed vehicle is attached to the towing vehicle when positioned above the towing vehicle, thereby enabling impacts or movement forces exerted on the towed vehicle to be partially transferred to the towing vehicle without damaging the tongue.

SUMMARY OF THE INVENTION

An improved coupler for the trailer tongue on a towed vehicle is designed to be pulled by a fixed tow hook mounted on the back of a towing vehicle. The coupler, hereinafter referred to as a 'tongue coupler', is configured to allow a user to easily change the connection site on the tongue coupler to allow the towed vehicle to pull the towed vehicle easily over a standard road or on an elevated surface and resist impact or moment forces that may be exerted on the towed vehicle or towed vehicle when connected that could damage to the trailer tongue.

More specifically, the tongue coupler is selectively or permanently attached to the distal end of a trailer tongue used on a towed vehicle, such as a hi-rail, used to transport heavy equipment or as a movable work platform on railroad tracks. The tongue coupler includes a vertically aligned, steel elongated tongue tube attached to the distal end of the trailer tongue. Mounted on the front surface of the tongue tube is a forward extending upper ring and a forward extending lower ring. Both rings include center holes that receive a tow hook mounted on the rear frame member or bumper on a towing vehicle.

The upper ring is attached at a location on the tongue tube so that it is approximately aligned with the longitudinal axis of the trailer tongue when attached to the upper ring. The lower ring is axially aligned under the upper ring and attached to the tongue tube at a location suitable for pulling a towed vehicle at an elevation approximately 12 to 24 inches higher than the roadway on which the towing vehicle is driven. The actual distance between the upper and lower rings may also vary depending on the length of the trailer tongue and the different elevations of the surfaces of the towing vehicle and towed vehicle. Ideally, the lower ring should be positioned at a distance so that the angle of the trailer tongue relative to the longitudinal axis of the towed vehicle is approximately 4 degrees. Additional gussets and brackets are provided between the trailer tongue and the tongue tube designed to resist compression forces and prevent collapse, and resist aft to fore or fore to aft forces exerted on the tongue tube during use.

In a second embodiment, the tongue tube may include an upper lid that forms a closed storage compartment inside the tongue tube. Disposed inside the storage compartment are additional plates used to hold chocks, straps, and other related items used for towing. In one embodiment, the additional plate may be a chock support plate that includes two slots that receive the tips of two, triangularly-shaped chocks aligned vertically and positioned side-by-side inside the storage compartment. Finally, a lock may be provided for locking the lid onto the tongue tube.

Mounted on the tongue tube is an adjustable jack that allows the tongue tube to be lowered or raised to align the desired ring with the tow hook mounted on the towing vehicle.

Also mounted on the tongue coupler or near the distal end of the trailer tongue are one or two optional, upward extending rods. Each rod includes a loop used to manage air hoses, hydraulic fluid hoses, or electrical cables that may extend over the trailer tongue.

DESCRIPTION OF THE PREFERRED EMBODIMENT(S)

Figure 1:
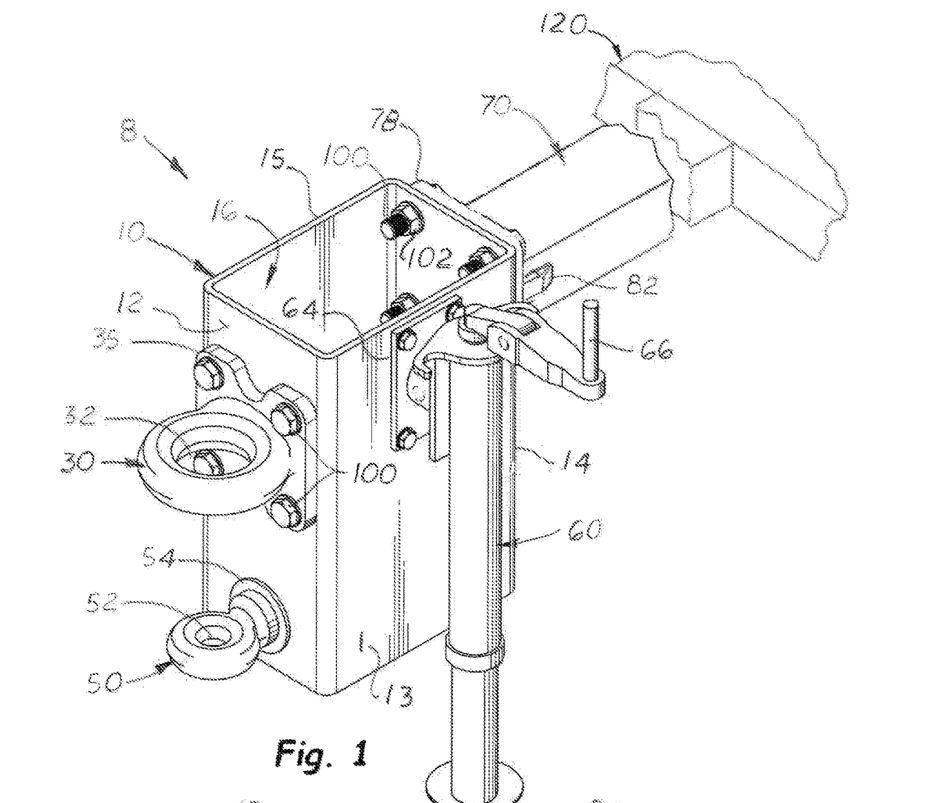
FIG. 1 is a perspective view of the first embodiment of a dual tow ring tongue coupler attached to the distal end of a tongue.
Figure 2:
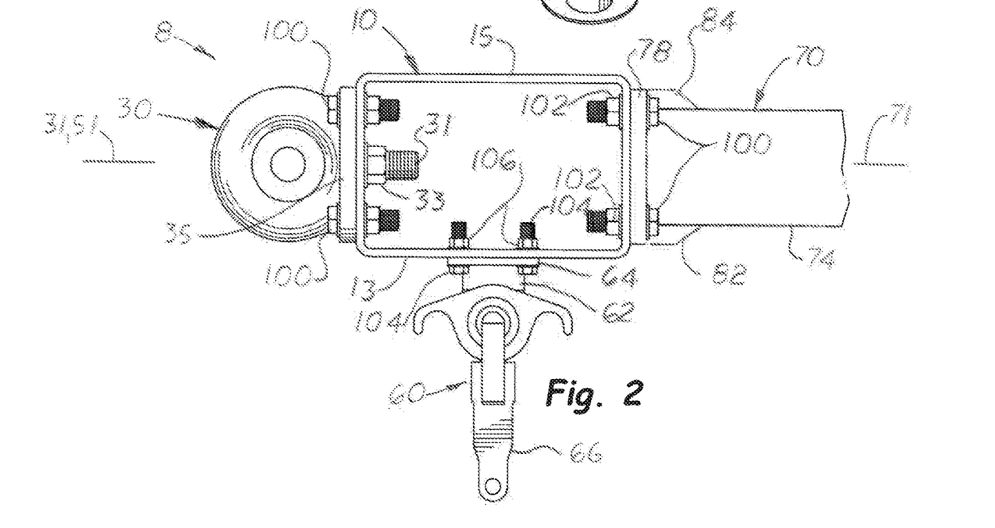
FIG. 2 is a top plan view of the tongue coupler shown in FIG. 2.
Figures 3, 4:
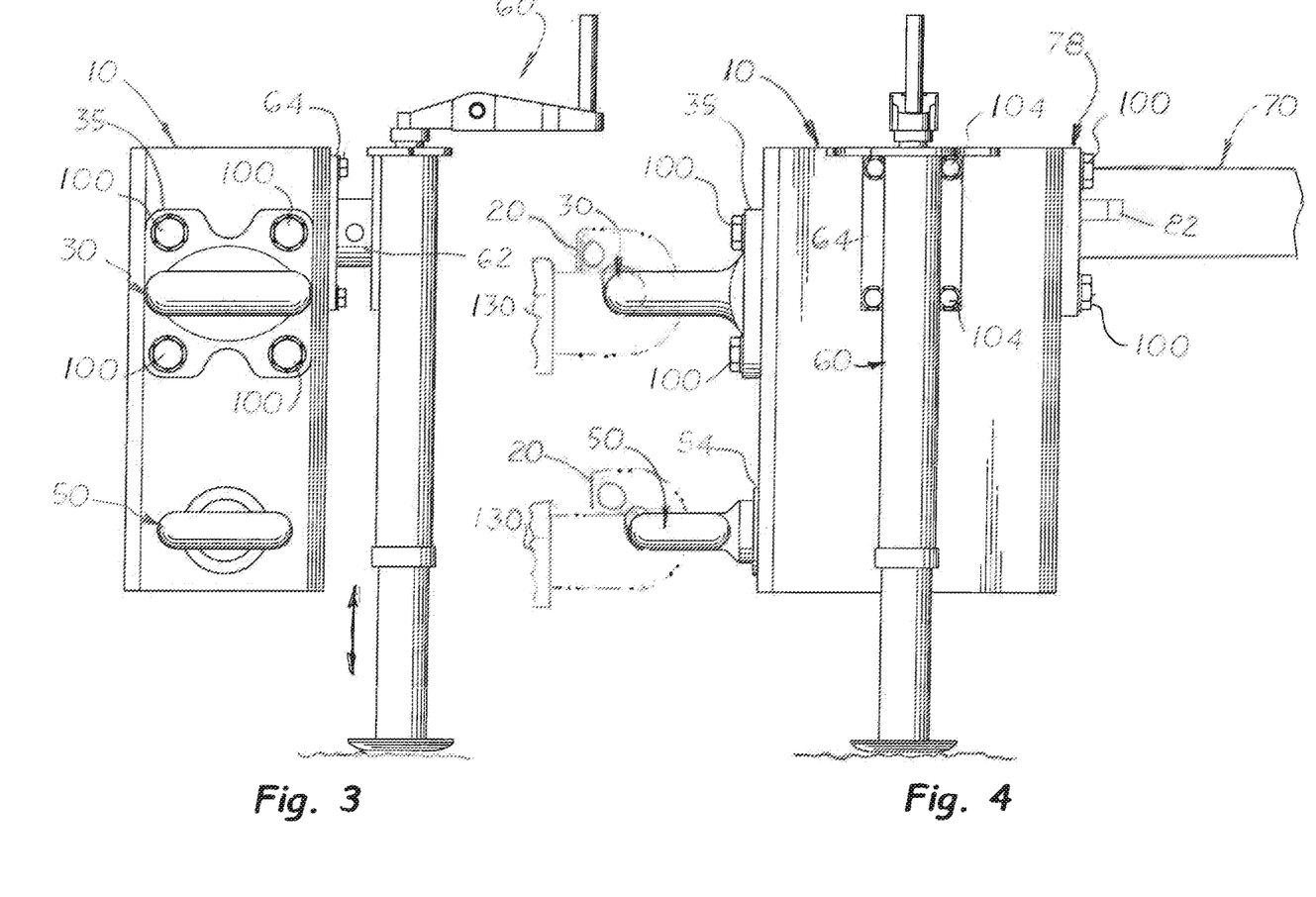
FIG. 3 is a front elevational view of the tongue coupler shown in FIG. 1.
FIG. 4 is a right side elevational view of the tongue coupler shown in FIG. 2.
Figures 5, 6:
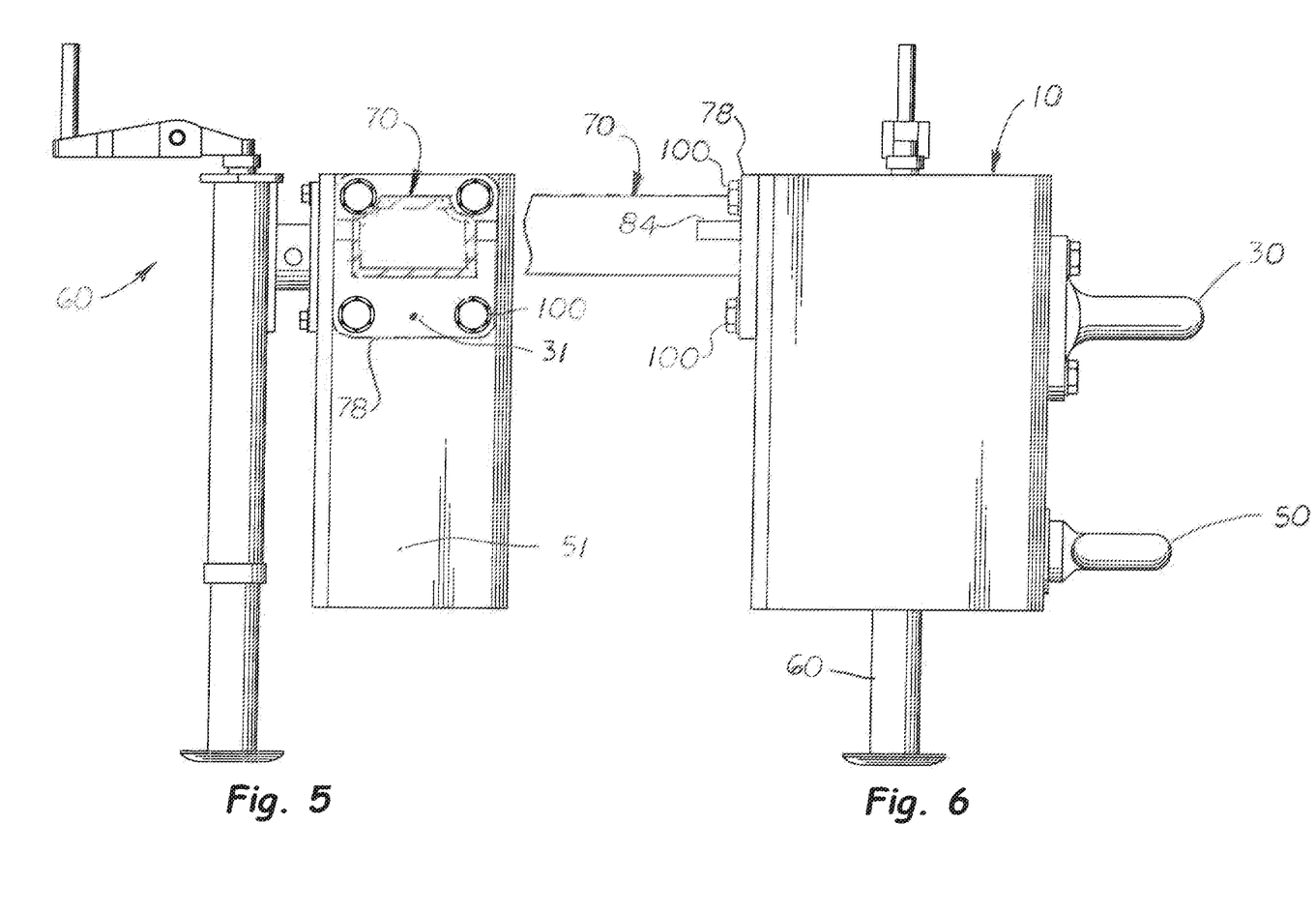
FIG. 5 is a rear elevational view of the tongue coupler shown in FIG. 1.
FIG. 6 is a left side elevational view of the tongue coupler shown in FIG. 2.
Figure 7:
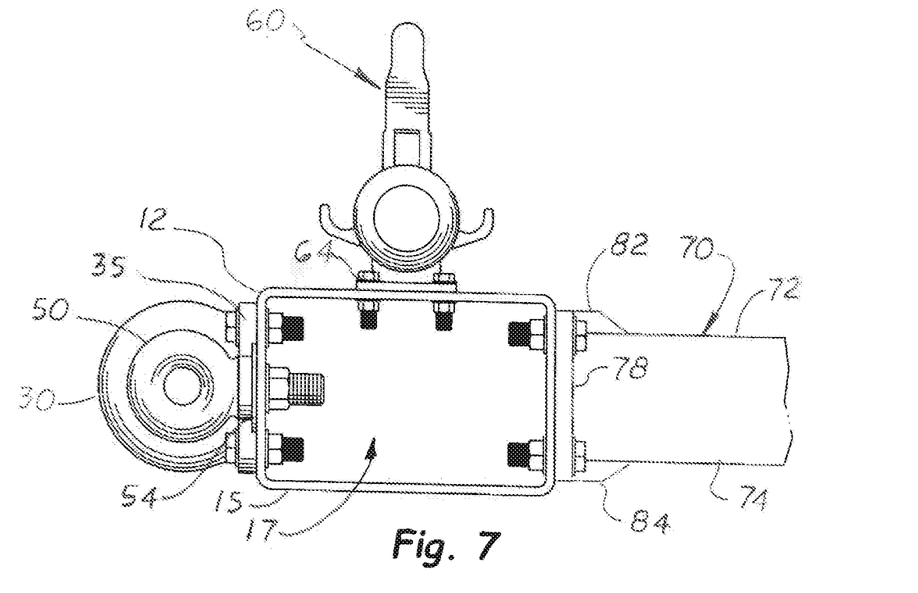
FIG. 7 is a bottom plan view of the tongue coupler shown in FIG. 1.

There are described and shown two embodiments of an improved tongue coupler 8, 8' both mounted on the distal end of a trailer tongue 70 attached to a towed vehicle 120 (shown in FIG. 1). Both tongue couplers 8, 8' are configured to be attached to a tow hook 130 (see FIG. 4), also called a Pintle hitch, mounted on the back of a towing vehicle (not shown). The tongue couplers 8, 8' may be selectively attached to the trailer tongue 70 or they may be permanently attached (i.e., welded) to the distal end of the trailer tongue 70.

FIGS. 1-10 shows a first embodiment of the tongue coupler 8 that includes a rectangular, vertically aligned elongated tongue tube 10. Mounted on the front surface 12 of the tongue tube 10 is an upper ring 30 called a lunette ring. The upper ring 30 is perpendicularly aligned with the front surface 12 and includes a center hole 32 configured to receive the receiver tow hook 130 shown in FIG. 4. The upper ring 30 may be directly mounted or welded to the front surface 12. In the embodiment shown in the Figs, a front support plate 35 is disposed between the front surface 12 of the tongue tube 10 and the upper ring 30 to provide additional support. The front support plate 35 is attached to the front surface 12 by four long bolts 100 that extend through the front surface 12. Nuts 102 are attached to the threaded end of each bolt 100 to hold the support plate 34 in a fixed position on the front surface 12. The upper ring 30 also includes a threaded post 31 that extends through a hole (not shown) formed on the support plate 34 and on the front surface 12. A nut 33 attaches to the threaded end of post 31 to hold the upper ring 30 in a fixed location on the tongue tube 10.

Also mounted on the front surface 12 of the tongue tube 10 is a forward extending lower ring 50 that includes a center hole 52 also configured to receive the tow hook 130. The lower ring 50 is welded to a support plate 54 welded to the front surface 12. In the embodiment shown herein, the lower ring 50 is axially aligned directly under the upper ring 30. The lower ring 50 is placed at a location on the tongue tube 10 to selectively attach to the receiver tow hook 130 when the towed vehicle 120 is elevated to travel over railroad tracks.

The sizes of the upper and lower rings 30, 50 respectively, depending on the maximum weight of the load on the towed vehicle. In the Figs, the lower ring 50 is smaller in diameter than the upper ring 30 and attached directly to the front surface 12. It should be understood that lower ring 50 may be the same size or larger than the upper ring 30.

The trailer tongue 70 is shown as an elongated rectangular structure in cross-section with flat side surfaces 72, 74 a top flat surface 50 and a flat bottom surface 76. In the embodiment shown in FIGS. 1-7, the trailer tongue 70 is configured to be selectively attached to the tongue tube 10. The distal end of the trailer tongue 70 is welded to a flat short mounting plate 78. The mounting plate 78 is attached to the rear surface 14 of the tongue tube 10 via four bolts 100 and four nuts 102. Attached to the side surfaces 82, 84 and adjacent areas on the mounting plate 78 are rearward extending gussets 82, 84, respectively.

Mounted on the either the right side 13 (shown) or left side 15 is an adjustable jack 60. Jack 60 is attached to a support arm 62 attached to support plate 64. The support plate 64 is attached to the side surface 13 of the tongue tube 10 via bolts 104 and nuts 106.

In some instances, the towed vehicle carries heavy equipment, such as cranes or scissor jacks that are operated when positioned on the towed vehicle and create excessive fore and aft directed forces on the trailer tongue when attached to a towing vehicle. An additional brace member may be provided to increase the tongue coupler's ability to handle these additional forces.

Figure 8:
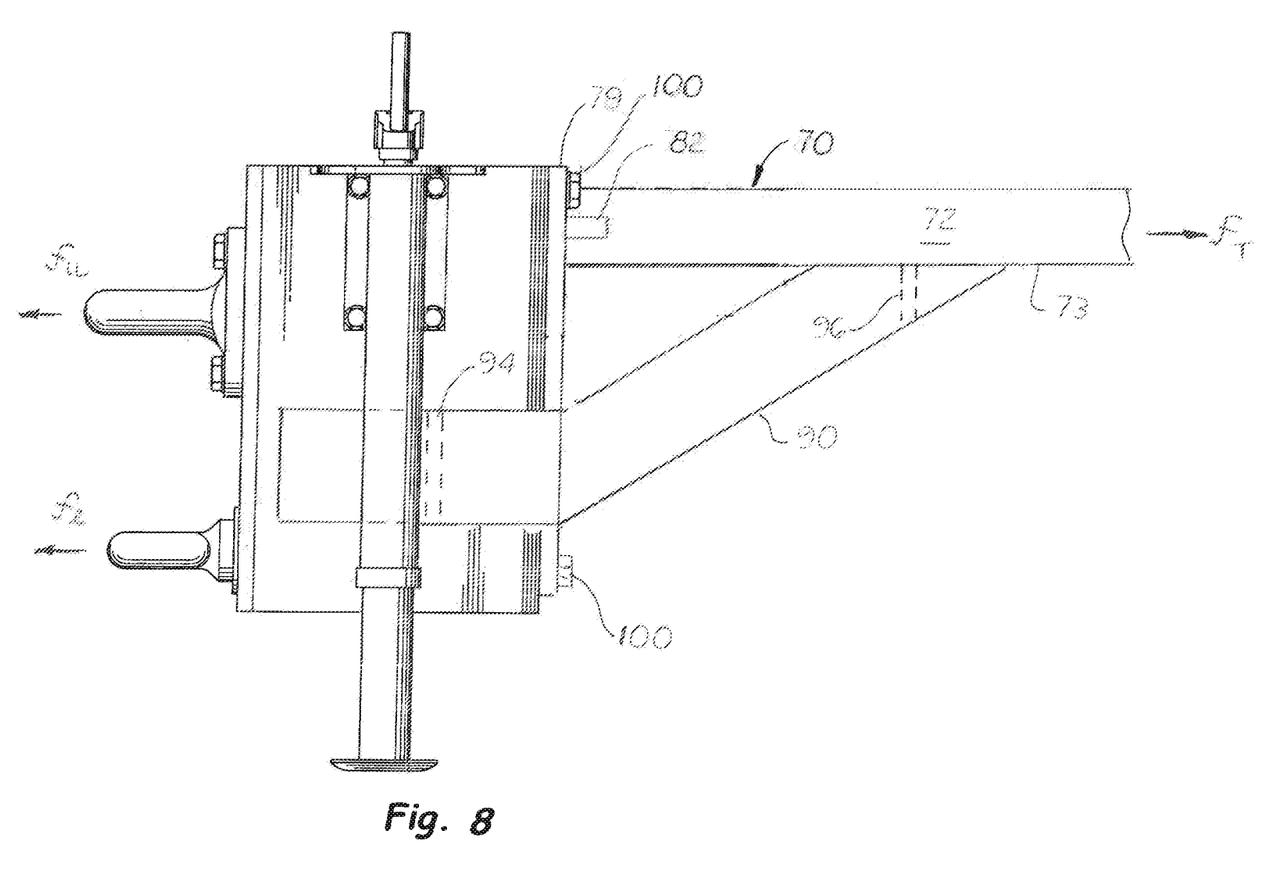
FIG. 8 is a side elevational view of a second embodiment of the tongue coupler that includes two diagonal gussets that extend from the outside surface of the tongue tube to the outside surfaces of the trailer tongue.
Figures 9, 10:
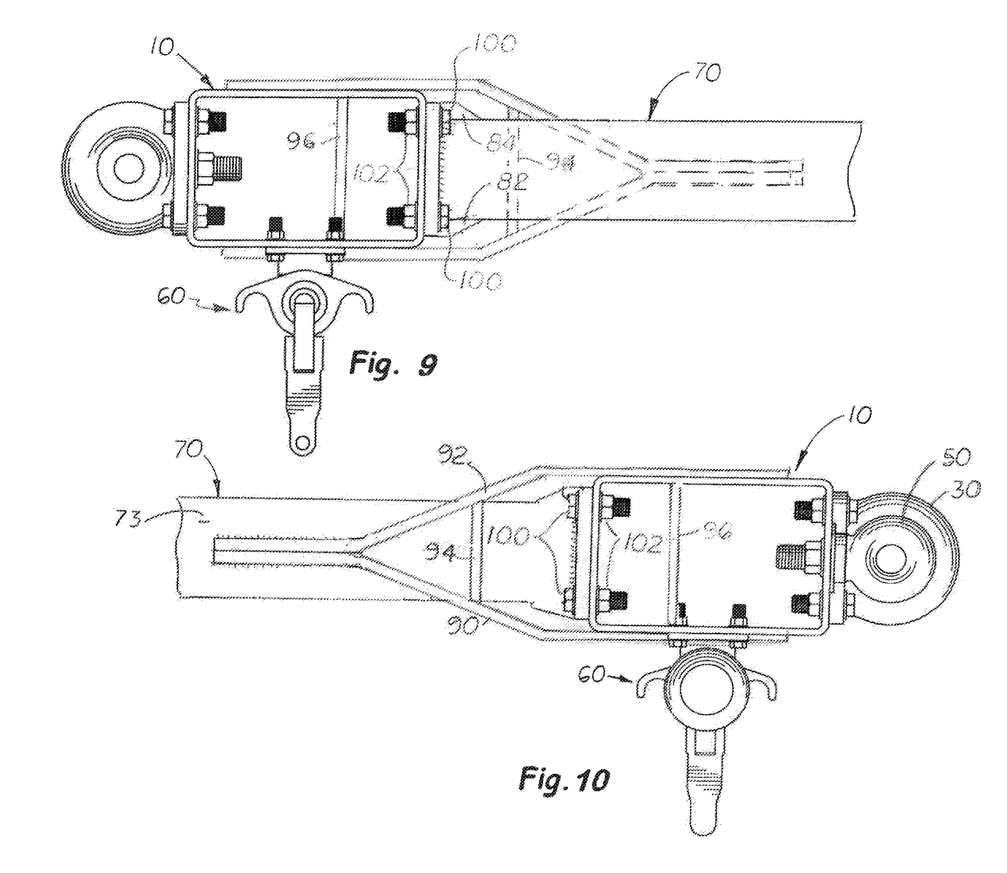
FIG. 9 is a top plan view of the tongue coupler shown in FIG. 8.
FIG. 10 is a bottom plan view of the tongue coupler shown in FIG. 8.
Figure 11:
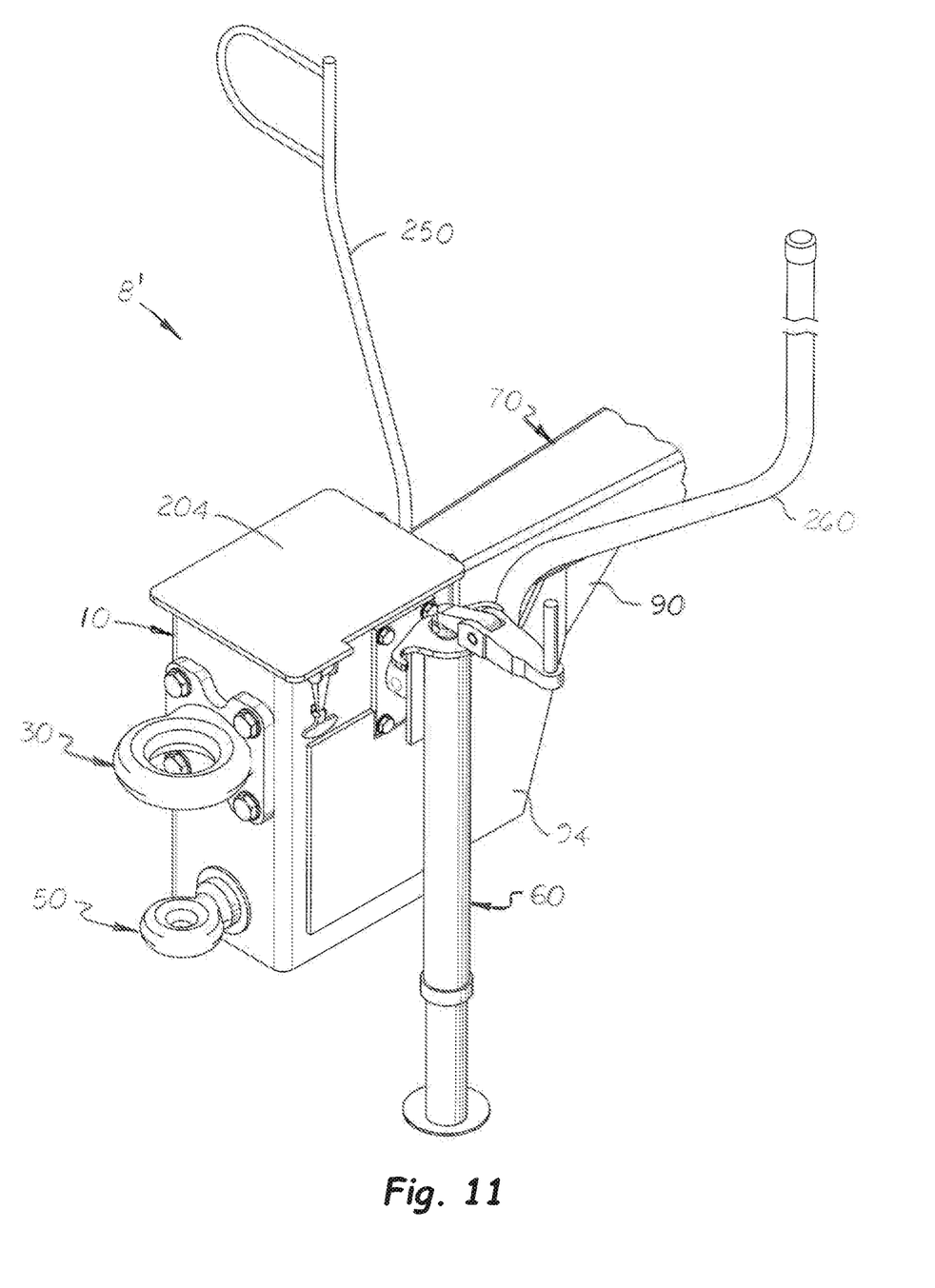
FIG. 11 is a perspective view of a second embodiment of the tongue coupler with a storage compartment located inside the tongue tube.
Figure 12:
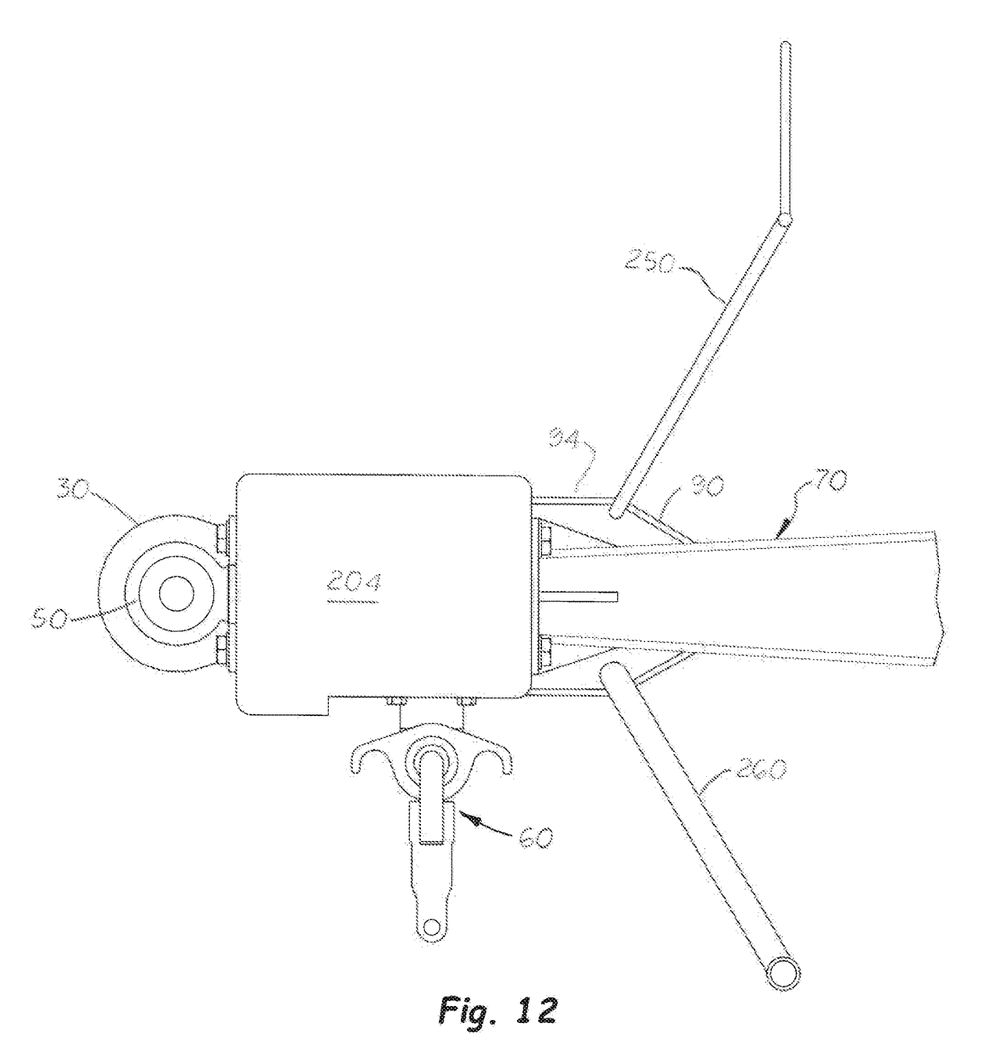
FIG. 12 is a top plan view of the tongue coupler shown in FIG. 11.
Figure 13:
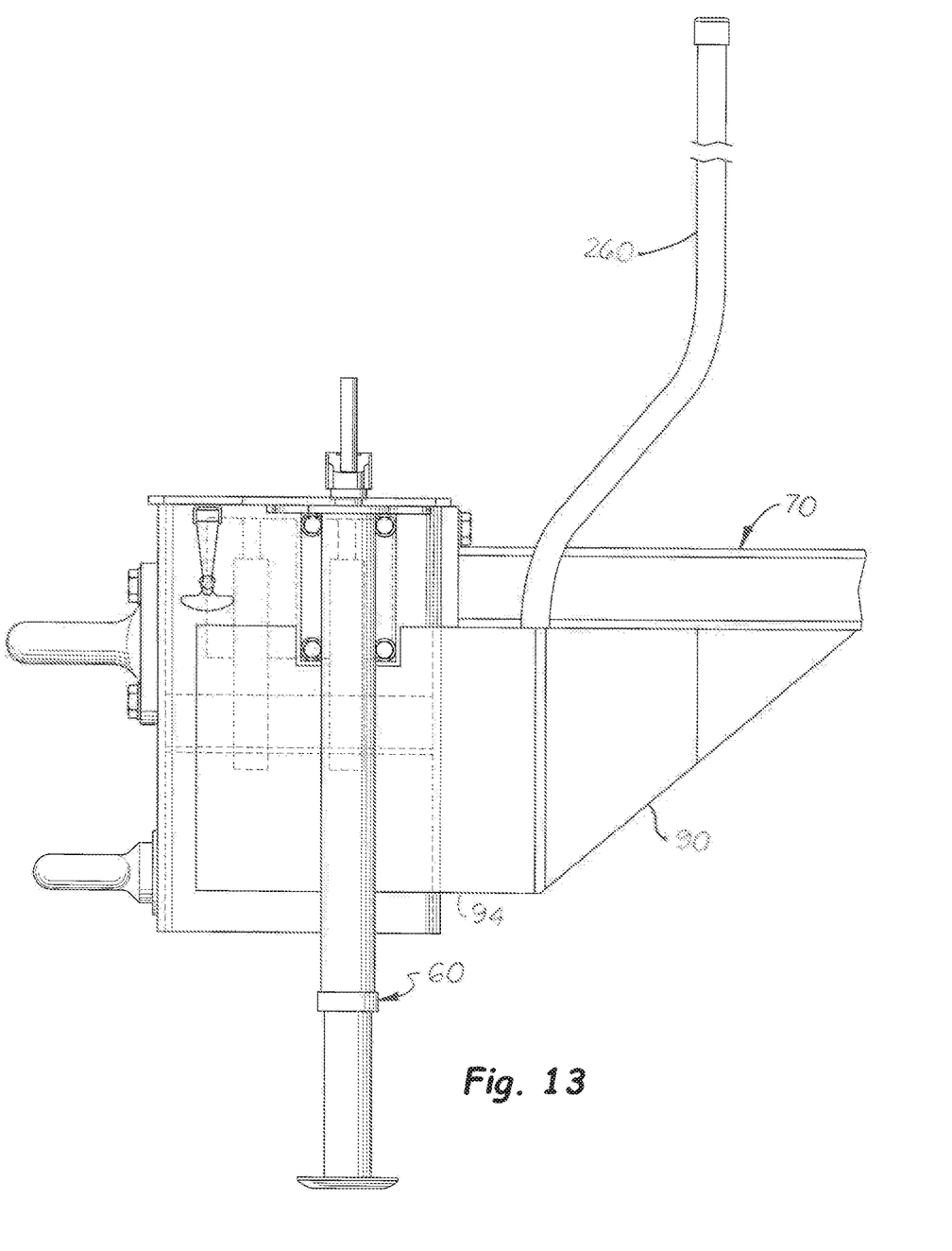
FIG. 13 is a side elevational view of the tongue coupler shown in FIG. 11.
Figure 14:
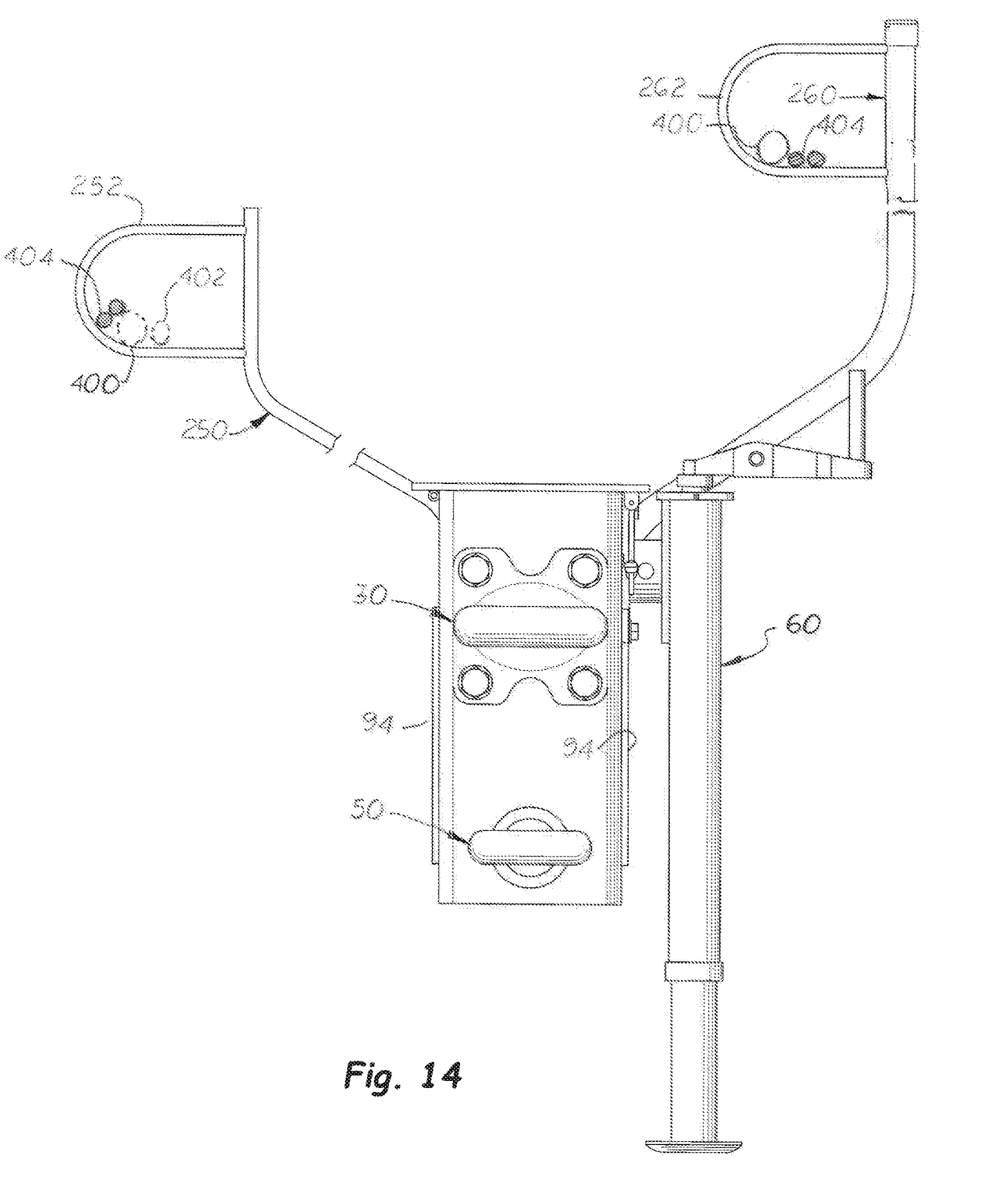
FIG. 14 is a top plan view of the tongue coupler shown in FIG. 11 with the lid in an open position.

As shown in FIGS. 8-10, welded to the opposite side surfaces 13, 15 on the tongue tube 10 are plate-like brace members 90 and 92. The brace members 90, 92 extend rearward from the tongue tube 10 and then bend upward and converge and connect (i.e. welded) to the bottom surface 73 of the trailer tongue 70. Disposed transversely between the two brace members 90, 92 is a short brace member 94. Also provided is a transversely aligned brace member 96 that connects at its opposite ends to the inside surfaces of the tongue tube 10.

FIGS. 11-16 show a second embodiment of the tongue coupler 8' that includes a storage compartment 202 formed inside the elongated tongue tube 10. Like tongue coupler 8, tongue coupler 8' includes an upper ring 30 and a lower ring 50 both axially aligned and mounted on the front surface 12 of the tongue tube 10.

Figure 15:
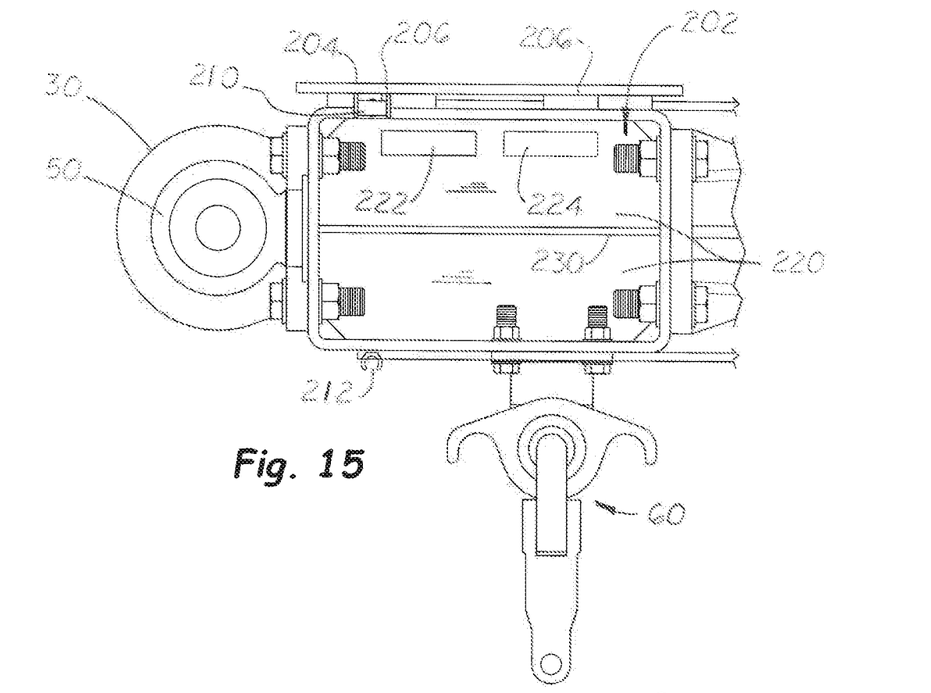
FIG. 15 is a top plan view of the tongue coupler shown in FIG. 11.
Figure 16:
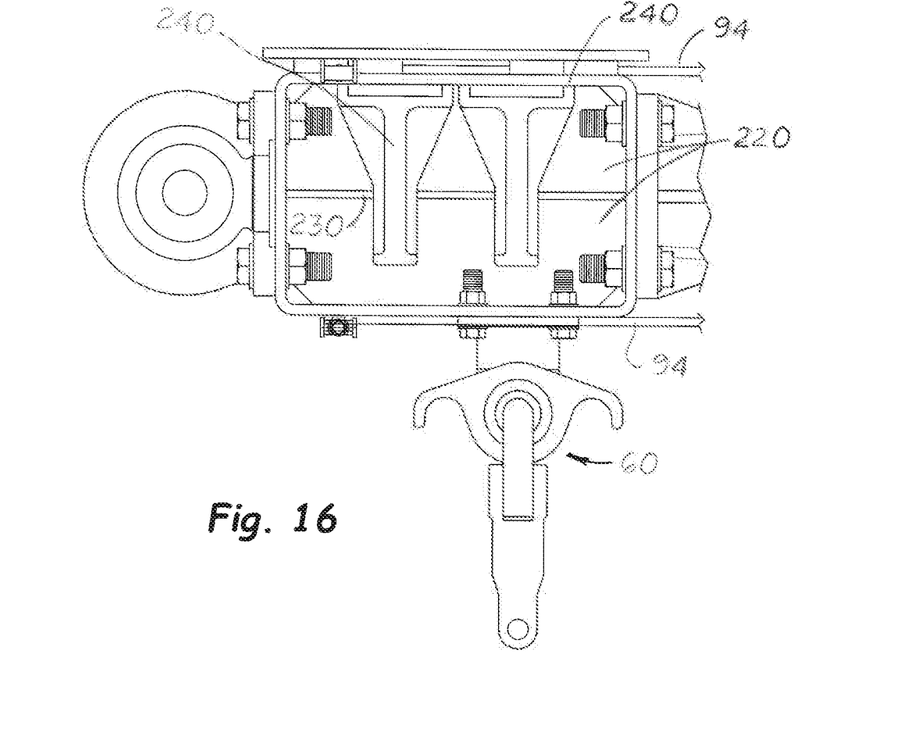
FIG. 16 is a top plan of the tongue coupler shown in FIG. 11 showing a pair of chocks in a stored position inside the storage compartment.

Attached to the upper edge of the tongue tube 10 is a lid 204. The lid 204 is attached two hinges 206 that enable the lid 204 to pivot over the top opening of the tongue tube 10 between closed (FIG. 11) and open positions (FIG. 15). Formed inside the tongue tube 10 and under the lid 204 is the storage compartment 202. Attached to the bottom surface of the lid is an elastic strap 210 that extends into a clip 212 mounted on the side of the tongue tube 10. During use, the elastic strap 210 extends downward when the lid 204 is in closed position to hold the lid 204 in closed position. It should be understood that a lock (not shown) may be used to lock the lid 204 in a locked position on the tongue tube 10.

Disposed inside the storage compartment 202 are additional plates used to hold chocks, straps and other related items used for towing. In one embodiment, the additional plate may be a bottom plate or a chock support plate 220 that includes two slots 222, 224 that receive the tips of a pair of triangularly-shaped chocks 240 aligned vertically and positioned side-by-side inside the storage compartment 202.

Figure 17:
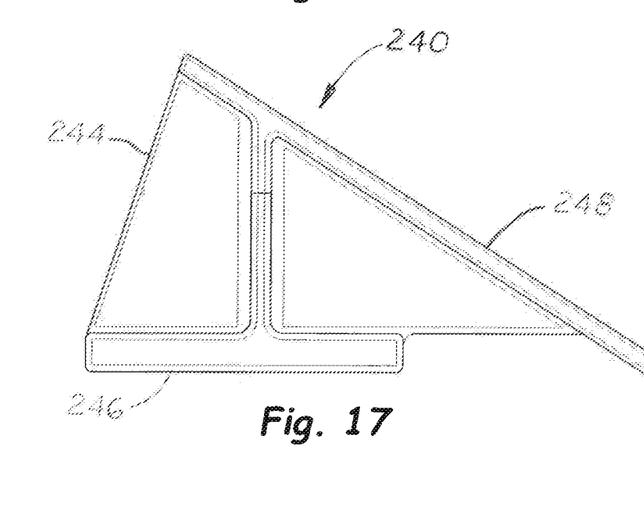
FIG. 17 is a side elevational view of a chock.
Figure 18:
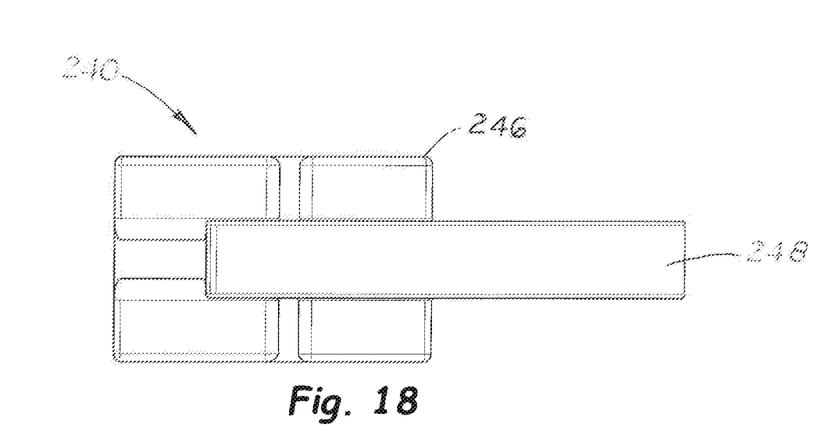
FIG. 18 is a top plan view of the chock shown in FIG. 17.
Figure 19:
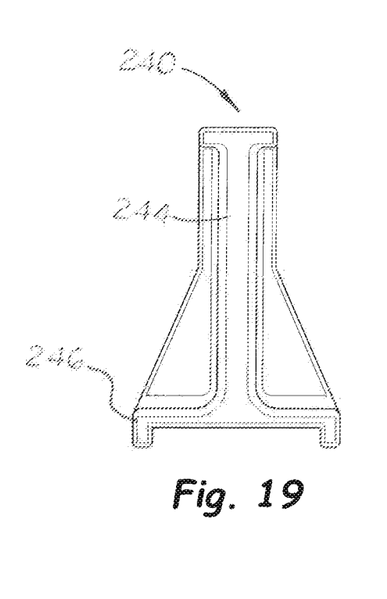
FIG. 19 is an end elevational view of the chock shown in FIGS. 17 and 18.

As shown in FIGS. 17-19, each chock 240 is triangular with a flat wide 246, a central thin vertical support member 244 and a diagonal member 248. During use the tip of each chock extends into a slot 222 or 224 formed on the chock support plate 220. As shown in FIGS. 15 and 15, a vertical divider plate 230 may be disposed also inside the storage compartment 202 to support the chocks 240 in a vertical alignment therein.

Also mounted on the tongue tube 10 or near the distal end of the trailer tongue 70 are one or two optional, upward extending rods 250, 260. Each rod 250, 260 includes a loop 252, 262, respectively, used to manage air hoses 400, hydraulic fluid hoses 402 or electrical cables 406 that may extend over the trailer tongue 70.

Figure 20:
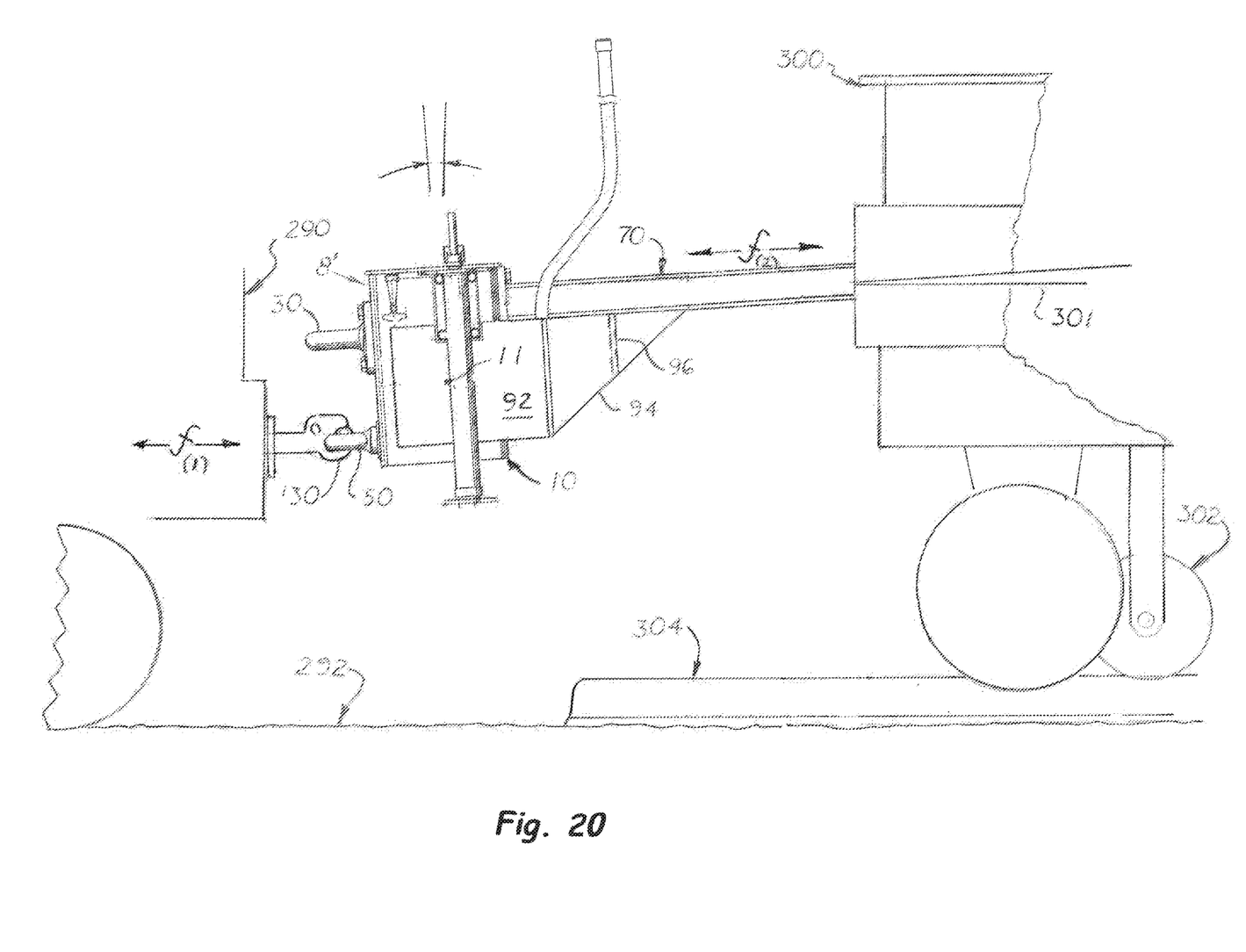
FIG. 20 is an illustration showing the downward angle of the trailer tongue attached to a hi-rail trailer mounted on railroad tracks when the lower ring on the tongue coupler is attached to a tow hook on the rear of the towing vehicle driven on a roadway adjacent to the railroad tracks.

FIG. 20 illustrates the downward angle of the trailer tongue 70 attached to an elevated towed vehicle, shown as a hi-rail trailer 300 with height-adjustable steel wheels 302 designed to roll over railroad tracks 304. To use the towing vehicle, depicted as a truck 290, to push or pull the hi-rail trailer 300 over the railroad tracks 304, the lower ring 50 on the tongue coupler (coupler 8' shown) is attached to a tow hook 130 on the rear of the truck 290. The truck 290 is shown driven on a lower roadway 292 adjacent to the railroad tracks 304. As stated above, the upper hook 30 is positioned on the tongue tube 10 so that the axis of the trailer tongue 70 is aligned with a longitudinal centerline extending between the center axes of truck 290 and the hi-rail trailer 300 when the tow hook 130 is attached to the upper ring 30. The lower ring 50 is located below the upper ring 30 at a distance so that the angle of the trailer tongue 70 is tilted downward approximately 4 degrees from the longitudinal axis 301 of the hi-rail trailer 300 when the truck 290 pulls the hi-rail trailer 300. During use, fore and aft directed impact and momentum forces f(1) and f(2), are applied both to the truck 290 and the hi-rail trailer 300, respectively. Such forces can cause the tongue tube 10 to rotate around its center axis 11. The use of brace members 92, 94, 96 prevents rotation of the tongue tube 10 on the distal end of the trailer tongue 70.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A coupler for selectively attaching the distal end of a tongue on a towed vehicle to a tow hook attached to a towing vehicle that is pushed or pulled over a support surface used by said towing vehicle or pushed or pulled over an elevated surface, said coupler comprising:
    a. a tongue tube with a front surface, a rear surface, a left side surface and a right side surface, said rear surface being attached to said distal end of said tongue;
    b. an upper ring attached to said front surface of said tongue tube and configured to selectively attach to said tow hook attached to said tongue on said towing vehicle; and;
    c. a lower ring attached to said front surface of said tongue tube, said lower ring being axially aligned with and located under said upper ring, thereby raising said tongue on said towed vehicle when attached to said tow hook attached to said towing vehicle when said towed vehicle is pulled over an elevated surface above said support surface used by said towing vehicle.

2. The coupler as recited in claim 1, further including an adjustable jack attached to said tongue tube.

3. The coupler as recited in claim 1, wherein said upper ring and said lower ring are spaced apart so that said trailer tongue is angled upward from said tow hook approximately 4 degrees when said towed vehicle is positioned on said elevated surface and said lower hook is attached to said tow hook.

4. The coupler as recited in claim 1, further including a storage compartment formed inside said tongue tube.

5. The coupler as recited in claim 4, further including a lid attached to said tongue tube.

6. The coupler as recited in claim 4, further including a pair chocks configured for storage inside said storage compartment.

7. The coupler as recited in claim 6, further including a chock support plate formed inside said storage compartment configured to hold said pair of chocks.

8. The coupler as recited in claim 7, further including at least two slots formed on said chock support plate configured to hold said pair of chocks vertically inside said storage compartment.

9. The coupler as recited in claim 1, further including at least one upper extend rod configured to hold hydraulic lines or electrical cables.

10. The coupler as recited in claim 2, further including a storage compartment formed inside said tongue tube.

11. The coupler as recited in claim 10, further includes a lid attached to said tongue tube.

12. The coupler as recited in claim 10, further including a pair chocks configured to be stored inside said storage compartment.

13. The coupler as recited in claim 12, further includes a chock support plate formed inside storage compartment configured to hold said pair of chocks.

14. The coupler as recited in claim 10, further including at least one upper extend rod configured to hold hydraulic lines or electrical cables.

* * * * *